United States Patent
McDermott et al.

[11] 4,018,508
[45] Apr. 19, 1977

[54] ELECTROCHROMIC DEVICE AND MEDIUM THEREFOR

[75] Inventors: Michael John McDermott; John Graham Allen; Keith Jones; Peter Gordon Wright, all of Runcorn, England

[73] Assignee: Imperial Chemical Industries Limited, London, England

[22] Filed: Mar. 14, 1975

[21] Appl. No.: 558,362

[30] Foreign Application Priority Data
Mar. 15, 1974 United Kingdom ............ 11597/74

[52] U.S. Cl. .......................................... 350/160 R
[51] Int. Cl.² ........................................... G02F 1/36
[58] Field of Search .......... 350/160 R, 160 P, 150; 252/299

[56] References Cited
UNITED STATES PATENTS

| | | | |
|---|---|---|---|
| 3,282,160 | 11/1966 | Jones et al. | 350/160 R |
| 3,451,741 | 6/1969 | Manos | 350/160 R |
| 3,774,988 | 11/1973 | Rodgers | 350/160 R X |
| 3,806,229 | 4/1974 | Schoot | 350/160 |

OTHER PUBLICATIONS

Schoot, C. J., Ponjee, J. J., et al., "New Electrochromic Memory Display", Appl. Phys. Lett., vol. 23, No. 2, July 15, 1973, pp. 64–65.

*Primary Examiner*—John K. Corbin
*Assistant Examiner*—Rolf Hille
*Attorney, Agent, or Firm*—Cushman, Darby & Cushman

[57] ABSTRACT

An electrochromic medium and electrochromic devices containing such mediums comprising an electrochromically active material, an auxiliary redox system comprising reversibly oxidizable metallic ions, for example iron, a complexing agent for the metallic ions, particularly a carboxylic acid such as tartaric acid, and an inert solvent.

17 Claims, 2 Drawing Figures

ELECTROCHROMIC DEVICE AND MEDIUM THEREFOR

This invention relates to electrochemical devices.

Electrochemical devices, and particularly display devices based on electrochemical phenomena are known which comprise a working electrode having radiation transmission or reflection properties; an organic active material, the oxidation state of which may be reversibly changed by passage of an electric current through it resulting in a detectable change in the appearance of the working electrode; and a counter electrode also in contact with the active material. For display purposes the radiation will usually be visible radiation, and the counter electrode will be so disposed with respect to the working electrode that changes occurring at the working electrode are not obscured from an observer thereof by reactions occurring at the counter electrode. The said electrodes and active material will be contained within a suitable housing comprising means, for example a transparent window, through which the working electrode may be observed.

Such devices have been described for example in British Pat. No. 1,314,049 (equivalent to U.S. Pat. No. 3,712,709) in British Pat. No. 1,302,000 and in U.S. Pat. No. 3,806,229.

The electrochemically active materials in such devices are capable of accepting or donating electrons and being thereby converted into radical ions which have a high extinction value, usually in the visible part of the spectrum. In general the materials as such have in one oxidation state no, or hardly any, colour, so that even by the passage of a small current at appropriate EMF high contrast images may be obtained, and for the purposes of the invention such materials are preferred.

The presence of an auxiliary redox system in the form of the system $Fe^{++} \rightleftharpoons Fe^{+++}$ is advantageous in electrochromic devices involving materials as disclosed above, and in our copending British Pat. No. 12904/73 we describe the use of ferrous ammonium sulphate as a particularly preferred additive whereby the said redox system may be incorporated into the electrochromic medium, (by electrochromic medium we mean a composition comprising the electrochromic active material; it may be liquid or solid or semi-solid, and will usually comprise essentially the electrochromic active material, together with an appropriate inert solvent therefor, and other components as may be desirable).

We have now found that the presence in an electrochromic medium comprising an auxiliary redox system of a complexing agent for metal ions of the redox system can further improve display devices disclosed in the aforementioned documents.

Accordingly the present invention provides an electrochromic device comprising a working electrode having radiation transmission or reflection properties; a counter electrode; and an electrochromic medium in contact with the working and counter electrodes, said medium comprising an active electrochromic material, an auxiliary redox system comprising metallic ions and a complexing agent for the said metallic ions in at least one oxidation state thereof.

The electrodes may be single or multiple (i.e. the device may comprise more than one working and/or counter electrodes), they may be transparent, translucent or opaque and they may be of the same or different materials. The electrodes may be of a noble metal, e.g. of Group VIII metals or, preferably, gold; of non-conducting material, e.g. glass, plastics or ceramic material carrying a layer usually very thin, of the order of $50A - 1\mu$ of electrically conducting material which will usually be a metal or conducting oxide; or of an electrically conducting non-metal, e.g. glass coated with indium or tin oxide. Platinum and particularly gold are preferred electrode materials, particularly in the form of a thin, (100A to 500A) transparent deposit upon a suitable insulating carrier, e.g. ceramic material or glass.

Where the device comprises a plurality of working electrodes each of the working electrodes may be provided with a separate counter electrode, although this is not essential, since a single counter electrode, for example in the form of a wire or gauze around the periphery of the device comprising a plurality of the electrodes, may be quite satisfactory. Alternative arrangements include a counter electrode, conveniently transparent deposited upon a wall of the housing, or on the reverse side of the working electrode substrate, where employed. Enhanced speed of response to passage of acurrent is given when the surface area of the counter electrode is greater than that of the working electrode.

The following represents a brief description of the drawings which are shown in the accompanying sheet:

Figure 1:
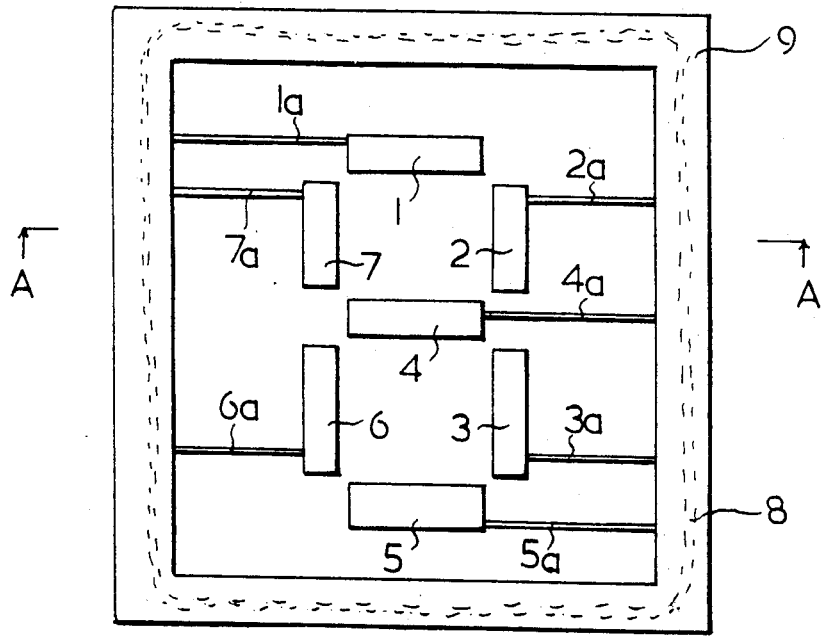
FIG. 1 represents the electrode arrangement of the electrochromic device in accordance with the invention.
Figure 2:
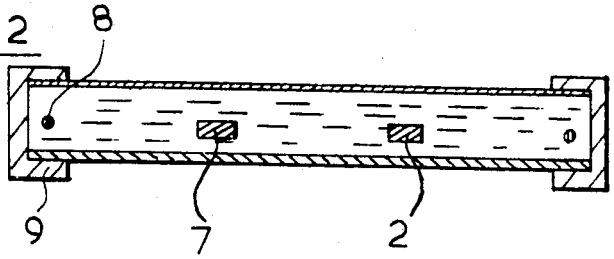
FIG. 2 represents a section along the line A—A in FIG. 1.

Preferably the device comprises a plurality of working electrodes so disposed that a preselected pattern, e.g. a numeral or letter may be made visible by the energising of appropriate electrodes. Such a device is illustrated in the attached drawing in which a plurality of working electrodes 1 to 7, each with its own lead 1a to 7a are disposed in a pattern capable of representing any numeral from 0 to 9 by deposition upon a preselected group of the electrodes. The counter electrode 8 is represented by a wire, disposed around the perimeter of the device 9.

The active material is an organic compound which is a bicyclic compound having two nitrogen containing rings. Particularly preferred are N-substituted derivatives of such compounds. Typical of these compounds are those disclosed in U.S. Pat. No. 3,712,709 in which the active material is a simple salt or a polymeric form of a mono or di-N-substituted-p-cyanophenyl of a bipyridal, diazapyrene or biquinolyl.

Similar compounds are disclosed in U.S. Pat. No. 3,806,229, in which compounds having the formula

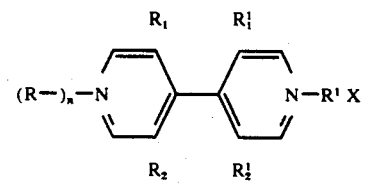

are employed as electrochromic materials. In these compounds R and $R^1$ each represent an alkyl or cycloalkyl group containing up to 18 carbon atoms or an unsaturated alkyl or cycloalkyl group containing up to 12 carbon atoms or an aralkyl or alkaryl group containing up to 10 carbon atoms or a phenyl group, which groups may be substituted in the aromatic nucleus with $CF_3$, a halogen, $CH_3$, $OCH_3$ or $NO_2$, a carbonamidoalkyl group in which the nitrogen atom may carry one or two alkyl groups which together with a hetero-atom may form a ring which group may contain up to 10 carbon atoms, an alkoxy carbonylalkyl group containing up to 16 atoms, a thienylalkyl group containing up to 10 carbon atoms or a nitrile group.

Further examples of electrochromic compounds are the polymeric dipyridilium compounds described in U.S. Pat. No. 3,641,034. The preferred compound for use in devices according to the invention is N,N'-di(p-cyanophenyl)4,4'-bipyridilium dichloride. If a simple salt is used deposition of the insoluble coloured radical cation species occurs over the plane surface of the working electrode. As the simple radical cation is insoluble it does not diffuse away from the electrode surface, and is easily reoxidised to the colourless form by reversal of the applied potential.

Alternatively the active material may contain the (p-cyano-phenyl) group attached to a polymeric structure. For example a 4-(4'-pyridyl)N-p-cyanophenyl pyridinium salt reacts with polyvinyl chloracetate or copolymers thereof with polyvinyl alcohol to form an active material for use in the invention. If polyvinyl alcohol units are present these may be cross-linked, e.g. with glyoxal, to give a gelled active material.

The N-(p-cyanophenyl) compound is reversibly reduced in the device to a radical species which is coloured, usually green, while the parent is colourless or pale yellow.

The active material is usually used in aqueous medium, e.g. water, optionally together with a compatible water-soluble polymer such as agar, gelatine, methyl cellulose, polyvinyl alcohol or polyvinyl-pyrrolidone. An inert electrolyte may be added to the medium to increase conductivity. Ammonium, quaternary ammonium and alkali metal salts, e.g. sulphates, bisulphates and fluoroborates are examples.

Examples of anions which may be associated with the active materials are halides, especially chloride, $SO_4^=$, $HSO_4^-$, $RSO_4^-$ (where R is an alkyl group) $SiF_6^=$ or $BF_4^-$.

The concentration of the active material may be as described in the patents referred to, that is, of the order of 0.001 M, but there may be some advantage in increasing it somewhat, so that our preferred concentration of the active material is between about 0.0002 and 0.05 M and more preferably from 0.001 to 0.02 M.

Any appropriate metallic-ion based auxiliary redox system may be employed according to the invention, and the suitability in any particular case may be determined by simple experiment. The preferred system is $FE^{++} \rightleftharpoons Fe^{+++}$. The concentration of the metal salt employed in the medium will be limited by its solubility in the solvent under the operating conditions employed as well as by optima otherwise determined. In the case of iron salts the concentration will usually be from 0.1 M to 0.6 M, and preferably about 0.5 M. The use of acid conditions, usually pH 1 to 6 preferably about pH 1 to 4 and more preferably pH 2 to 3 may be advantageous in stabilising the $FE^{++} \rightleftharpoons Fe^{+++}$ reaction. Such conditions may be attained by the presence of an appropriate quantity of an acid, conveniently sulphuric or hydrochloric acid (powerful oxidising acids e.g. $HNO_3$ should obviously be avoided), although certain of the complexing agents disclosed below are themselves sufficiently acid to obviate the need for the addition of further acid.

The iron salt may be incorporated in any convenient form, although it is important that any ions introduced with the iron are compatible with the system. For example chloride ion is undesirable in large concentrations since this tends to attack other components of the device over a period of time. The suitability of any particular iron compound for this purpose may be determined quite easily by simple trial. We prefer to add the iron in the form of ferrous ammonium sulphate, although ferrous sulphate may be employed, as well as ferric ammonium sulphate for example. Impurities are preferably kept to a minimum, since they tend to affect the operation of the device adversely. Preferably ferric ion is added in only very small quantity, and more preferably it is substantially absent from the iron-containing additive.

The presence of a complexing agent for the metal ion of the auxiliary redox system, we have found, tends to reduce the likelihood of deposition of undesirably insoluble compounds; for example, there is a tendency for a relatively permanent deposit of hydrated ferric oxide to appear upon prolonged use of a device containing uncomplexed iron.

The complexing agent employed will, of course, be compatible with the other components of the device; it will be appropriately soluble in the electrochromic medium, and it will be capable of forming a complex with metal ions in the medium to prevent their permanent precipitation.

Selection of a suitable complexing agent will be on the basis of known chemical characteristics and suitability of any particular agent for application in a given environment is easily determined by simple trial. Essentially the complex formed with the metal ion should be colourless or substantially so (unless the formation of a colour with the complexed metal ion is employed as part of the display, or is not visible within the display area) and should be soluble so that the complexed ion remains available in solution for reduction to the reduced form. The concentration of the complexing agent will usually be between 0.02 M to saturation, preferably between 0.1 and 0.7 M and more preferably between 0.25 and 0.5 M (where the higher concentration in each case is below saturation concentration). Care will, of course, be taken that the concentration of the complexing agent, as with all solutes, is such that undesirable deposition of solid does not occur at the temperatures at which the device may be required to function. The agent should also, of course, be soluble in the electrochromic medium to the extent required.

The complexing agent is preferably an organic compound capable of complexing with the metal ion to form a 4 to 7 membered chelate ring. Examples of such compounds include saturated compounds (cyclic or acyclic) containing carboxyl, and preferably hydroxy groupings appropriately located within the molecule. Preferred are saturated mono- and di-hydroxy carboxylic acids, particularly $\alpha$ and $\beta$-OH carboxylic acids. Examples of such compounds include formic, acetic, citric, tartaric, succinic, malic, malonic, cyclopropane 1,2 dicarboxylic, and cyclopropane 1-OH, 2-carboxylic acids. Tartaric acid is the preferred acid, the $D^{(+)}$ form being most suitable by virtue of its solubility, as also is the meso form.

Acids which precipitate the metal at the concentrations used, for example oxalic acid with iron, are obviously unsuitable.

Reduction and deposition of the active material is conveniently effected by applying an EMF of the order of 0.8 to 1.25 v for 100 milli-seconds. However the operation of electrochromic devices is discussed thoroughly in the aforementioned patents.

In some circumstances it may be desirable to employ a small 'holding voltage' of the order of 0.2 to 0.4 v to maintain a display, although with tartaric acid we have found that this usually to be unnecessary.

It is most desirable to exclude molecular oxygen from within the device (e.g. dissolved in the liquid medium) since this tends to promote the formation of hydroxides of iron.

EXAMPLE 1

A device according to the invention was prepared as follows. Seven working electrodes (gold), arranged as shown in FIG. 1, were deposited upon a glass plate 1 inch square and ⅛ inch thick. The metal deposite forming the electrode was about 1000 A thick. The plate was located within a cell and around the periphery of the plate was positioned a counter electrode in the form of a spiral wire. Connection to the electrodes were made as appropriate so that current could be passed to all or some of them as required.

The electrochromic medium contained N,N'-di(p-cyanophenyl)4,4'-bipyridilium dichloride in aqueous solution at a concentration of 0.01 M. The solution also contained ferrous ammonium sulphate in 0.5 M concentration, and $D^{(+)}$ tartaric acid in 0.5 M concentration. The medium had a pH of 2.

A potential of 0.8 v was employed to operate the device, which was cycled at 22° C (by reversing the polarity of the working and counter electrodes) $1 \times 10^7$ times without apparent deterioration.

A comparative experiment using dilute hydrochloric acid to acidify to pH2 instead of tartaric acid operated successfully although some fading of the deposit did tend to occur in the absence of a holding voltage.

EXAMPLE 2

Three devices were prepared as in Example 1. A potential of 0.8 v was employed to operate the devices which were cycled at −5° C, +50° C, +60° C respectively $1 \times 10^7$ times without apparent deterioration.

EXAMPLE 3

A device similar to that of Example 1 was prepared using ferrous sulphate instead of ferrous ammonium sulphate but omitting the acid and acidifying with HCl to pH2. Deterioration of the system led to failure within a few hundred cycles.

EXAMPLE 4

Example 3 was repeated but using tartaric acid in 0.5 M concentration in the aqueous medium instead of hydrochloric acid. No failure of the system occured after 10,000 cycles.

EXAMPLE 5

Example 1 was carried out using the following carboxylic acids in 0.25 and 0.5 M concentrations instead of hydrochloric acid:

Table

| Acid | Effect |
|---|---|
| Formic | Maintained very clear solution, colour and bleach reactions rather slow (ca 5 secs.). |
| Acetic | Some darkening of the solution occured but the cell had a long lifetime, fast colour and bleach. |
| Citric | Reaction quite fast but gradually became slower. |
| Tartaric | Long life, no degradation, fast colour and bleach at temperature up to 60° C. Colour held without using holding voltage. |
| Succinic | Fast colour, slower bleach. |
| Malic | Fast colour, some tendency for bleaching to occur on open circuit, i.e. without reversal of current, which is usually used to effect bleaching. |
| Malonic | Very clear solution, fast reaction |

The effects of complexing agents were not identical as will be seen from the Table, although one had a beneficial effect. It will be apparent that selection of an appropriate complexing agent may be made in the light of these different properties and the desired effect.

What we claim is:

1. An electrochromic medium comprising an active material, an auxiliary redox system comprising a substantially colourless complex of reversibly oxidisable metallic ions and a complexing agent for the said metallic ions and an inert solvent.

2. An electrochromic medium according to claim 1 in which the active material is a bicyclic compound having two nitrogen containing rings.

3. An electrochromic medium according to claim 2 in which the active material comprises a mono- or di-N-substituted bipyridyl, diazapyrene or biquinolyl compound.

4. An electrochromic medium according to claim 3 in which the active material is an N-(p-cyanophenyl) substituted derivative of a bicyclic compound having two nitrogen containing rings.

5. An electrochromic medium according to claim 4 in which the active material is an N,N'-di(p-cyanophenyl)-4,4'-bipyridyl salt.

6. An electrochromic medium according to claim 1 in which the auxiliary redox system comprises ferrous and ferric ions.

7. An electrochromic medium according to claim 6 in which the iron is present in a concentration within the range 0.1 M to 0.6 M.

8. An electrochromic medium according to claim 1 in which the complexing agent is an organic compound capable of complexing with the metal ion to form a 4- to 7- membered chelate ring.

9. An electrochromic medium according to claim 8 in which the complexing agent is a carboxylic acid.

10. An electrochromic medium according to claim 9 in which the complexing agent is a mono- or di-hydroxy carboxylic acid.

11. An electrochromic medium according to claim 10 in which the complexing agent is a α- or β-hydroxy-carboxylic acid.

12. An electrochromic medium according to claim 10 wherein the complexing agent is selected from the group consisting of formic, acetic, citric, tartaric, succinic, malic and malonic acids.

13. An electrochromic medium according to claim 12 in which the complexing agent is selected from the group consisting of $D^{-(+)}$ and meso-tartaric acids.

14. An electrochromic medium according to claim 9 in which the complexing agent is present in a concentration within the range 0.1 M to 0.7 M.

15. An electrochromic medium according to claim 14 having a pH within the range of 2 to 3.

16. An electrochromic device comprising a substantially colourless complex of a working electrode having radiation or reflection properties; a counter electrode; and an electrochromic medium in contact with the working and counter electrodes, said medium comprising an active electrochromic material, an auxiliary redox system comprising metallic ions and a complexing agent therefor..

17. An electrochromic device comprising a housing containing working and counter electrodes, said electrodes being in contact with an aqueous medium comprising a substantially colourless complex of an N-(p-cyanophenyl) substituted derivative of a bicyclic compound having two nitrogen containing rings, an $Fe^{++}$ $Fe^{+++}$ based auxiliary redox system and a carboxylic acid complexing agent for $Fe^{+++}$ ions.

* * * * *